United States Patent [19]
Moreira et al.

[11] Patent Number: 5,539,408
[45] Date of Patent: Jul. 23, 1996

[54] METHOD FOR THE DETECTION, LOCALIZATION AND VELOCITY DETERMINATION OF MOVING TARGETS FROM RAW RADAR DATA FROM A COHERENT, SINGLE- OR MULTI-CHANNEL IMAGE SYSTEM CARRIED ALONG IN A VEHICLE

[75] Inventors: Joao Moreira, Landsberg; Wolfgang Keydel, Hechenfeld, both of Germany

[73] Assignee: Deutsche Forschungsanstalt für Luft- und Raumfahrt e.V., Köln, Germany

[21] Appl. No.: 498,561

[22] Filed: Jul. 6, 1995

[30] Foreign Application Priority Data

Jul. 8, 1994 [DE] Germany .......................... 44 23 899.1

[51] Int. Cl.$^6$ ...................................................... G01S 13/90
[52] U.S. Cl. ............................ 342/25; 342/90; 342/107; 342/108; 342/115; 342/162; 342/163
[58] Field of Search .............................. 342/25, 90, 107, 342/108, 113, 115, 162, 163

[56] References Cited

U.S. PATENT DOCUMENTS

| | | | |
|---|---|---|---|
| 4,053,885 | 10/1977 | Tomita et al. | 342/162 |
| 4,321,601 | 3/1982 | Richman | 342/25 |
| 4,940,988 | 7/1990 | Taylor, Jr. | 342/93 |
| 5,311,188 | 5/1994 | Meijer et al. | 342/90 |
| 5,323,162 | 6/1994 | Fujisaka et al. | 342/25 |
| 5,342,349 | 8/1994 | Mims | 342/25 |

FOREIGN PATENT DOCUMENTS

3922428C2   1/1991   Germany .

OTHER PUBLICATIONS

R. Keith Raney, Synthetic Aperture Imaging Radar and Moving Targets, vol. AES.7, No. 3, pp. 499–505, May 1971.
Kazuo Ouchi, On the Multilook Images of Moving Targets by Synthetic Aperture Radars, vol. AP–33, No. 8, pp. 823–827, Aug. 1995.
Barbarossa et al, Space–Time–Frequency Processing of Synthetic Aperture Radar Signals, vol. 30, No. 2, pp. 341–358, Apr. 1994.

Primary Examiner—John B. Sotomayor
Attorney, Agent, or Firm—Browdy and Neimark

[57] ABSTRACT

In a method for the detection, localization and velocity determination of moving targets from raw radar data from a coherent, single- or multi-channel image system (SAR), for representing the surface of the earth with different backscatter ratios, chronologically successive azimuth spectra are continuously formed during a defined period of time and a frequency shift of the backscatter ratio portion is obtained by determining the position of the maximum of the correlations between respectively two azimuth spectra formed chronologically directly in succession. Then the frequency shifts of the entire raw radar data set are evaluated for producing a frequency shift map.

By searching for values deviating from the nominal Doppler rate in the Doppler rate map, a respective moving target is detected and the center of an image of the detected moving target is formed from this.

By neglecting its radial acceleration, the tangential velocity of the moving target is determined by means of a Doppler rate taken from the Doppler rate map, and finally the radial velocity of the moving target is determined from the ratio of a length of the moving target in the range direction on the Doppler rate map and the duration of a scanning time by the antenna.

1 Claim, 6 Drawing Sheets

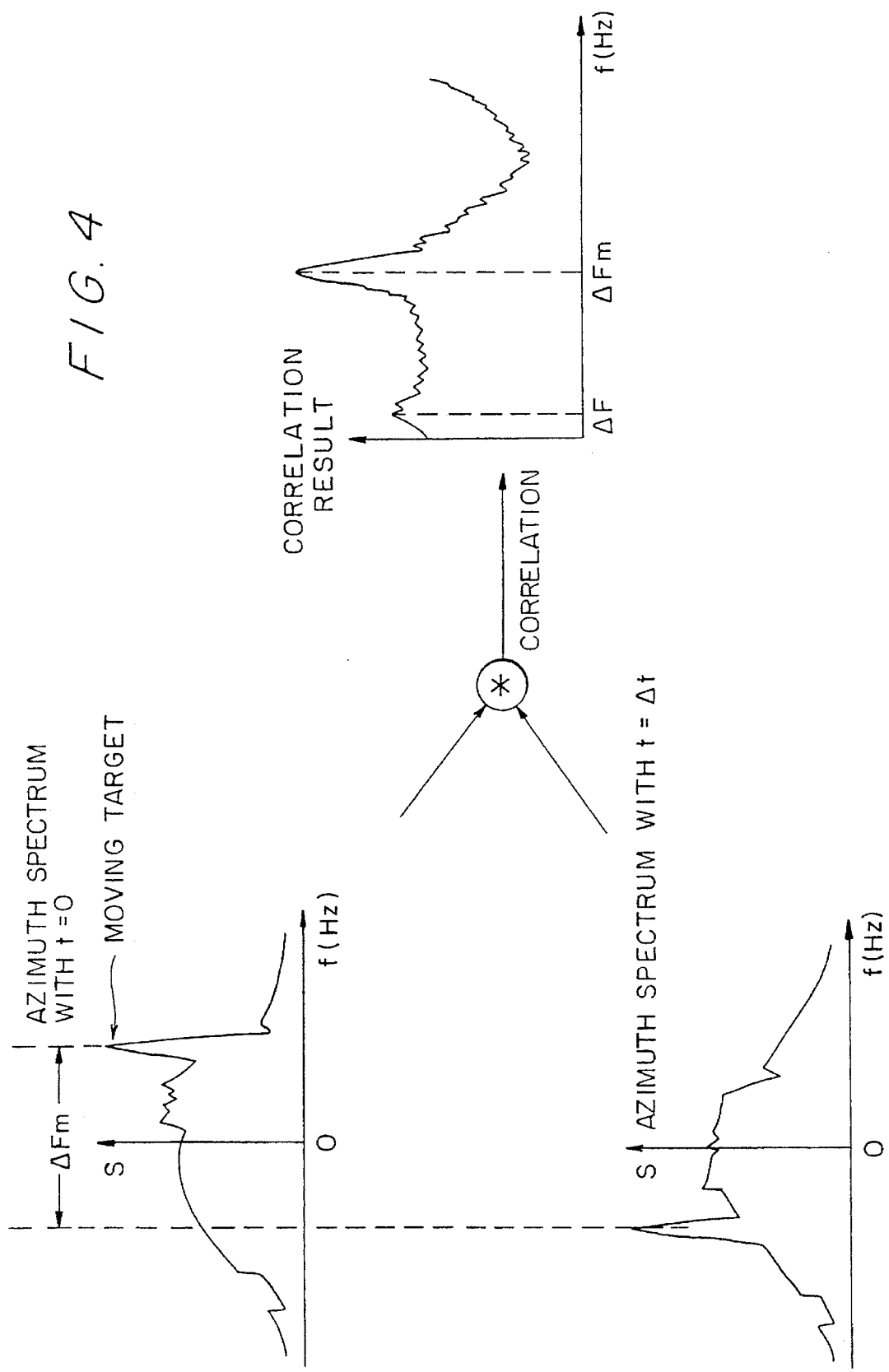

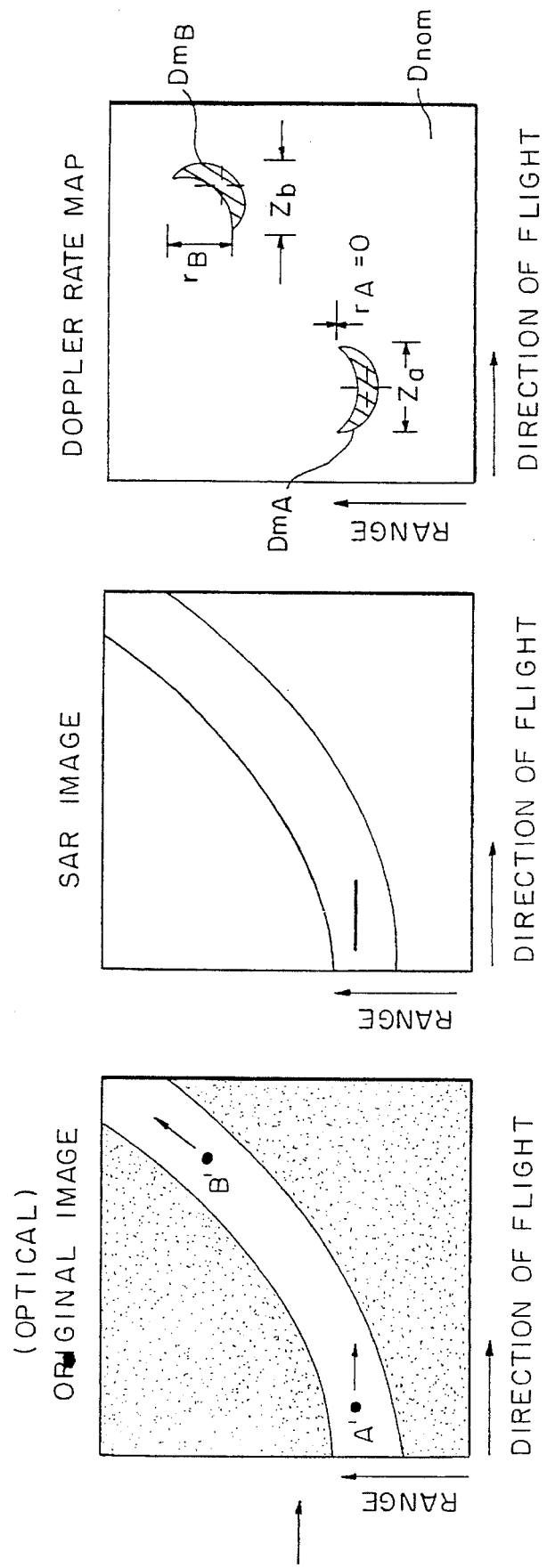

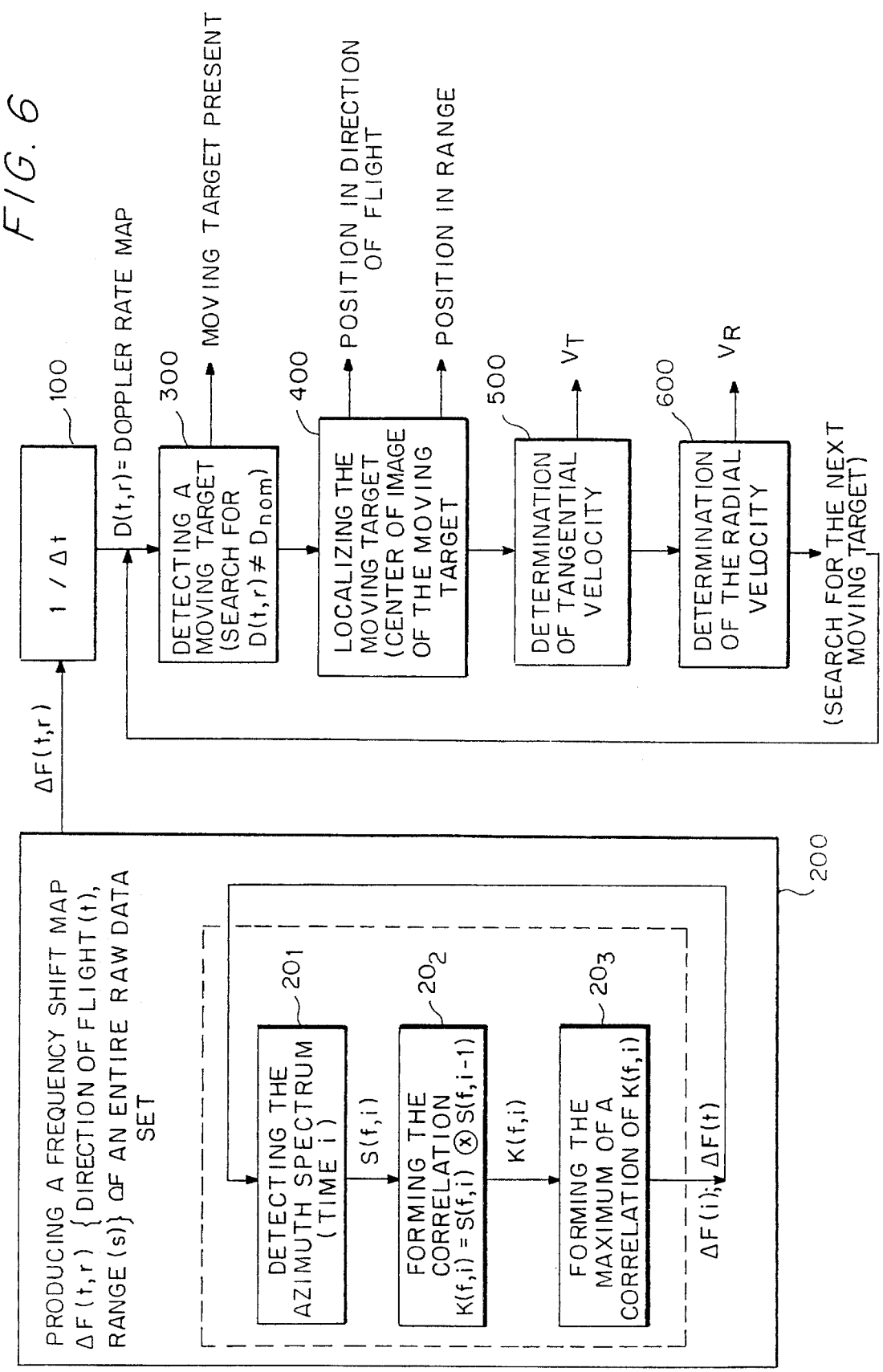

METHOD FOR THE DETECTION, LOCALIZATION AND VELOCITY DETERMINATION OF MOVING TARGETS FROM RAW RADAR DATA FROM A COHERENT, SINGLE- OR MULTI-CHANNEL IMAGE SYSTEM CARRIED ALONG IN A VEHICLE

FIELD OF THE INVENTION

The invention relates to a method for the detection, localization and velocity determination of moving targets from raw radar data from a coherent, single- or multi-channel image system (SAR) carried along in a vehicle in accordance with the preamble of the claim.

BACKGROUND OF THE INVENTION

A Doppler coding of the received signals generated by the movement of the carrier vehicle is decisive in connection with processing of raw SAR data. Basically, an SAR processor arranges all targets, whose Doppler frequency appears to be zero (0), in the image in an exactly radial direction (i.e. perpendicularly to the direction of flight). It is therefore basically possible to exactly bring into focus and position non-moving fixed targets.

However, in the course of this, targets which move in a fixed target environment and therefore have a different relative velocity in relation to the aircraft are possibly not displayed or not brought into focus or, shifted from their actual position as function of the different Doppler frequency depending on their radial velocity, they are indicated at wrong places in the image (in this case the tangential shift in respect to the original, actual position is a direct measurement of the radial velocity).

The problem of parameter calculation by means of SAR of moving targets in respect to location, velocity, amplitude, etc., was first investigated by K. Raney in 1971 (see R. K. Raney, Synthetic Aperture Imaging Radar and Moving Targets, IEEE Transactions AES-7, No. 3, May 1971). The primarily optical methods of SAR processing at that time permit only incomplete statements regarding the presence, the exact location and the velocity of moving targets.

However, the observation and measurement of moving targets gains increasing importance today, because the computer technology and therefore also the SAR processing technology has been developed correspondingly. Up to now, a solution to the problem was attempted in accordance with the following four methods:

1. A. Freeman suggests in the article "Simple MIT Using Synthetic Aperture Radar", IGARSS 84 Proc., ESA SP215, pp. 65 to 70, to employ a very high pulse-repetition frequency and a narrow antenna lobe. However, frequency ranges occur in the process in which not fixed targets, but the signals of basically moving targets with corresponding radial velocities, appear. By means of this, moving targets can be detected and their radial velocity determined.

2. It furthermore has been proposed by Klemm and Ender in "New Aspects of Airborne MTI", IEEE Proc. International Radar Conference, Washington, May 1990, to employ an array of four antennas and four receiver candles for receiving SAR signals. It was said to be possible by means of this to determine the velocity vector of moving targets in a clutter environment within a clutter frequency band.

3. K. Ouchi proposes a multilook method, wherein the change in position of moving targets is determined by the change detection in the course of reviewing several images taken in sequence (multilook) (see K. Ouchi, "On the Multilook Images of Moving Targets by SAR", IEEE Transactions AP-33, No. 8, August 1985, pp. 823 to 827).

4. S. Barbarossa and A. Farina suggest the use of a Wigner-Ville distribution for the detection and bringing into focus of moving targets (see S. Barbarossa and A. Farina, "A Novel Procedure for Detecting and Focusing Moving Targets with SAR Based on the Wigner-Ville Distribution", IEEE Proc. International Radar Conference, Washington, May 1990). This is data processing similar to the matched filter method.

The methods proposed by K. Ouchi as well as S. Barbarossa and A. Farina are theoretical suggestions, not yet realizable, for the separation of fixed and moving targets. In both cases a very high signal/clutter amplitude ratio is required. Exact positioning is difficult and the measurement of the velocity vector is extremely inexact.

The method proposed by Klemm and Ender is very promising; however, a very large hardware expenditure in the form of four antennas with four receiving candles is required; this can possibly mean a large weight, a circumstance which is crucial in a negative way, in particular in connection with applications in satellites. Furthermore, blind zones occur in principle, within which a velocity measurement is not possible. More than that, the measuring range basically extends between 3 km/h to 600 km/h.

Only rapid targets can be detected with the method of A. Freeman, and either images of the fixed targets or of the moving targets can be obtained, but not both at the same time. Furthermore, only the measurement of the radial velocity component is possible, the tangential component can not be determined.

SUMMARY OF THE INVENTION

It is therefore the object of the invention to detect moving targets in a clutter environment, to recognize them as such and to position them exactly, and to determine the size and direction of their velocity vector, so that it becomes possible to measure as exactly as possible the radial as well as the tangential velocity of the target, besides the radar backscatter cross section provided by the signal amplitude.

The object is attained in accordance with the invention in connection with the method for the detection, localization and velocity determination of moving targets from raw radar data from a coherent, single- or multi-channel image system (SAR) carried along in a vehicle in accordance with the preamble of the claim by means of the features in its characterizing part.

In accordance with the invention, the object is attained by evaluating the azimuth spectrum of raw radar data. Two methods are employed in the course of evaluating an azimuth spectrum, for one a method for determining the frequency shift of the backscatter ratio portion of the azimuth spectrum, which is described in DE 39 22 428 C2 of Applicant, and a method for the detection, localization and determination of the tangential and the radial velocity of moving targets. The method for the detection, localization and determination of the tangential and the radial velocity of the moving targets required for the evaluation of the azimuth spectrum will be described in detail below. Both methods can be executed with the aid of an array processor or a parallel computer in real time, or off-line by means of a conventional computing system.

BRIEF DESCRIPTION OF DRAWING

The invention will be explained in detail below by means of a preferred embodiment, making reference to the attached drawings. Shown are in:

FIG. 4, analogously to the representation in FIG. 3, the schematic development of an azimuth spectrum at two different times (t=0 and t= Delta t), as well as their correlation, wherein a moving target is present;

FIGS. 5a to 5c, a schematic representation of an original optical image, an SAR image or a Doppler rate map; and FIG. 6, a flow chart of the method of the invention.

DETAILED DESCRIPTION OF EMBODIMENT

In methods for the extraction of movement errors, basically the azimuth spectrum of the raw radar data and in particular the portion stemming from the backscatter ratio are evaluated; in what follows, this method will be called the shift method.

Figures 1A, 1B:
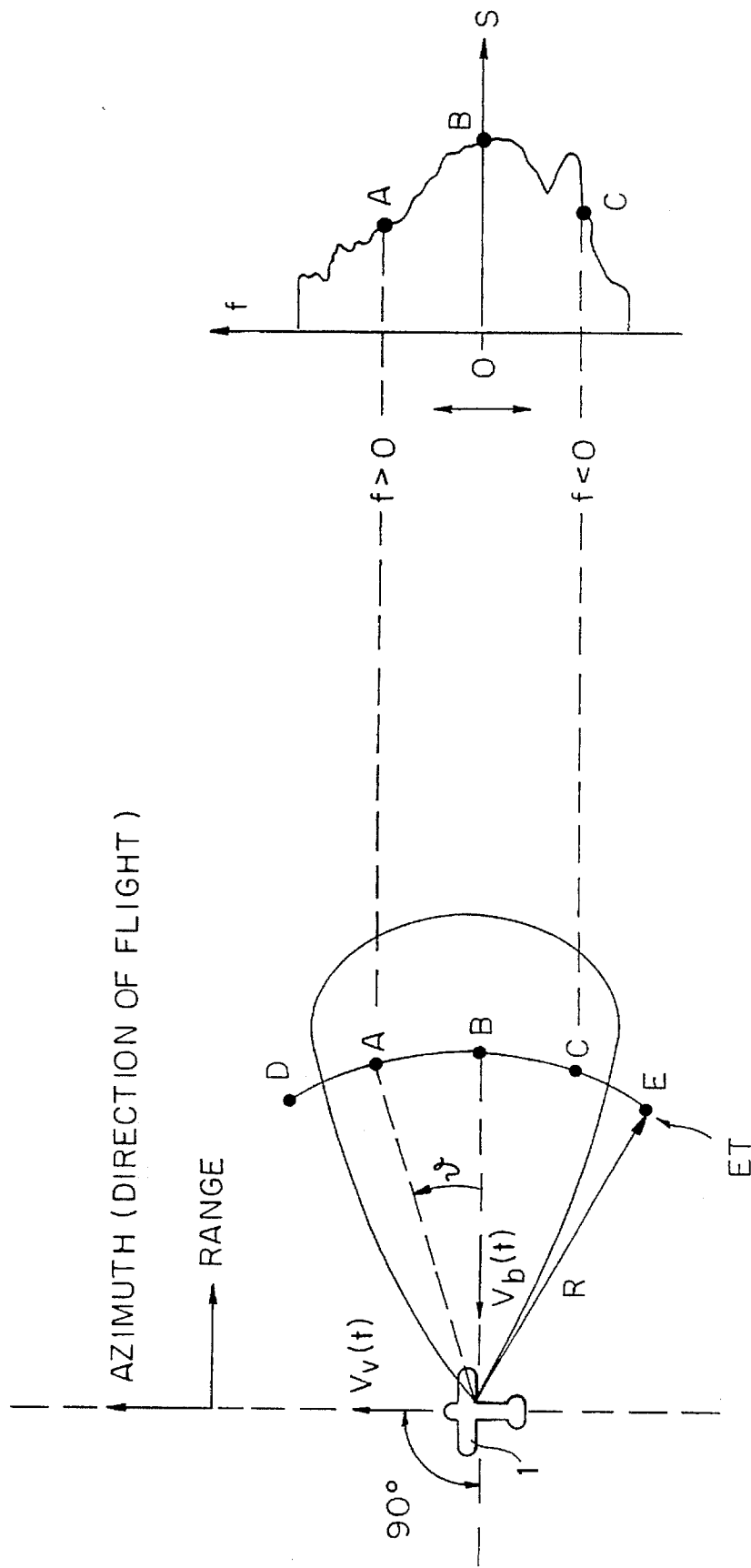
FIG. 1a, a general schematic representation of a radar geometry.
FIG. 1b, an azimuth spectrum of a range gate in the form of a diagram.

An example of a conventional radar geometry and of the corresponding azimuth spectrum is represented in FIG. 1a. A vehicle for a radar system in the form of a schematically indicated aircraft 1 is intended to fly at a velocity $V_v$ and therefore have a velocity error $V_b$ in the viewing direction of an antenna, not shown in detail, whose main lobe is schematically represented. The two velocities $V_v$ and $V_b$ are functions of the time t and are therefore identified in the drawings and hereinbelow by $V_v(t)$ and $V_b(t)$. A terrain to be mapped is scanned by the main antenna lobe, which is oriented transversely to the direction of travel, of the radar antenna attached to the aircraft 1. Spot targets A, B, C, D and E, for example, in a defined range gate Et are provided as the targets to be detected. Only the spot targets A, B and C are scanned in FIG. 1.

Because of the airspeed $V_v(t)$ and the velocity $V_b(t)$ in the viewing direction, each backscatter signal contains a frequency or Doppler shift, represented in the following equation $$\Delta F(t) = \frac{2 \cdot V_v(t) \cdot \sin \theta}{\lambda} + \frac{2 \cdot V_b(t) \cdot \cos \theta}{\lambda}$$

wherein theta is the angle between the radar line of sight toward the respective spot target and the line perpendicular to the aircraft (which in the example shown extends through the spot target B), and wherein lambda identifies the wavelength of the emitted radar signal.

A positive frequency shift is created for the spot target A by means of the angle theta>0 and the airspeed $V_v(t)$, while a negative frequency shift is created for the spot target C by the angle theta<0 and an airspeed $V_v(t)$. No frequency shift is created for the spot target B (=0) by the velocity $V_v(t)$.

An azimuth spectrum of the range gate Et is schematically represented in FIG. 1b, in which the frequency f is entered on the vertical axis and on the horizontal axis the output S in respect to the three spot targets A, B and C. Furthermore, it is indicated to the left of the vertical axis that the frequency f is greater than 0 in the positive direction and less than 0 in the negative direction.

Figure 2C:
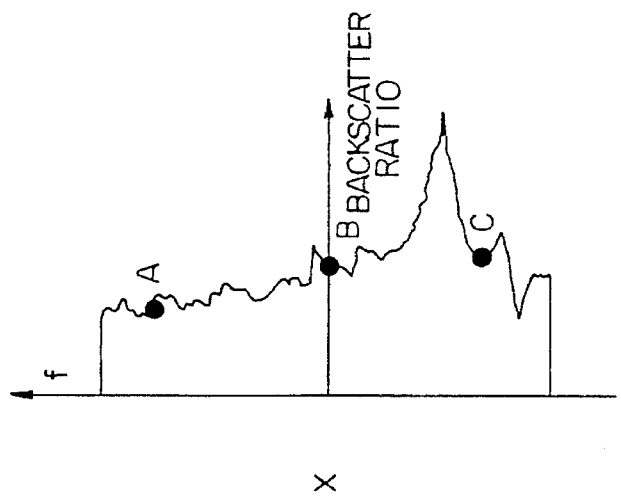
FIGS. 2a to 2c, schematic representations of diagrams which, in their totality, form an azimuth spectrum, wherein FIG. 2a schematically represents the azimuth spectrum of a range gate, FIG. 2b the schematic development of a spectrum of an antenna diagram, and FIG. 2c the schematic development of a spectrum of a backscatter ratio.
Figure 2B:
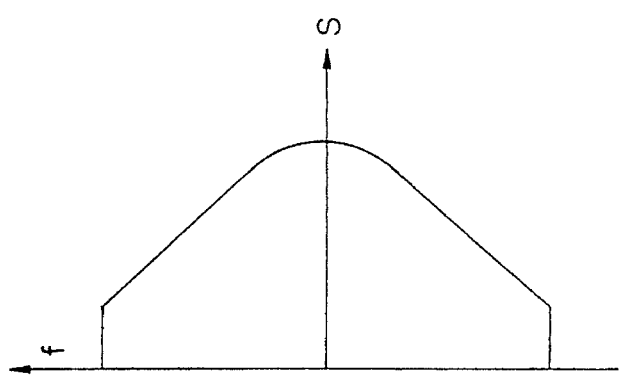
Figure 2A:
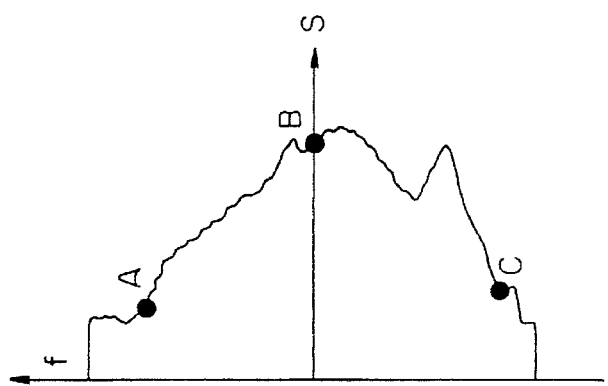

The composition of an azimuth spectrum is shown by means of schematic curve progressions in FIGS. 2a to 2c, wherein the frequency f is entered on the vertical axis and the output S on the horizontal axis in the individual representations. As can be seen from FIGS. 2b and 2c in particular, the azimuth spectrum of a range gate Et represented in FIG. 2a is essentially composed of the product of the antenna diagram in the azimuth direction, shown in FIG. 2b, and the backscatter ratio provided by the respective spot targets A, B and C and represented in FIG. 2c, wherein the backscatter ratio is understood to be the ratio between the output of a received and a transmitted signal.

The antenna diagram portion of an azimuth spectrum represented in FIG. 2b is shifted in frequency by means of a drift angle and the velocity in the viewing direction of the antenna in accordance with the following equation, wherein the result for the frequency shift $f_a$ is:

$$f_a = \frac{2 \cdot V_v(t) \cdot \sin \rho(t)}{\lambda} + \frac{2 \cdot v_b(t)}{\lambda}$$

wherein $\phi(t)$ is the drift angle of the vehicle.

The portion of the backscatter signal ratio of the azimuth spectrum is only frequency-shifted by the velocity in the viewing direction of the antenna in accordance with the equation below. The result of this frequency shift $f_r$ is:

$$f_r = \frac{2 \cdot v_b(t)}{\lambda}$$

The basic concept of a method for extracting the movement errors of a vehicle transporting a coherent image radar system consists in that the two portions of an azimuth spectrum schematically represented in FIGS. 2b and 2c, namely the antenna diagram portion and the backscatter ratio portion, are separated from each other and are separately evaluated.

Figure 3:
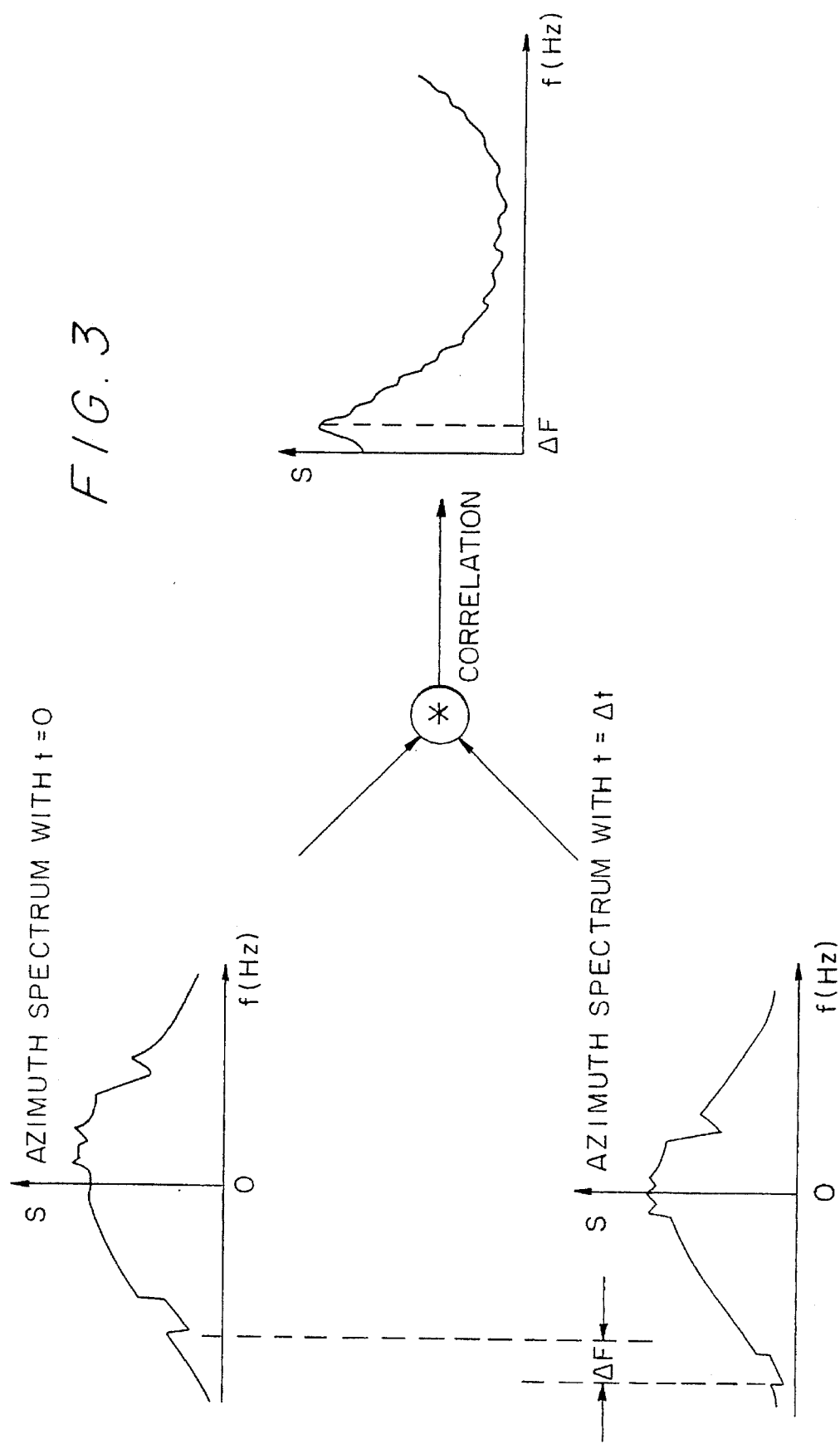
FIG. 3, the schematic development of an azimuth spectrum at two different times (t=0 and t= Delta t), as well as their correlation, wherein no moving target is present.

In the shift method described in DE 39 22 428 C2, the shift between two chronologically successive azimuth spectra is evaluated. Two such azimuth spectra are represented in FIG. 3, namely in the upper portion for the time t=0 and in the lower portion for the time t= Delta t. In both azimuth spectra the output S, as a function of the frequency $f(H_z)$ on the abscissa, is entered on the ordinate. Furthermore, a shift Delta F in respect to the azimuth spectrum in the upper portion of FIG. 3 is shown in the lower diagram.

When employing the method known from DE 39 22 428 C2, the terrain to be mapped must have different backscatter ratios, so that the curves representing the backscatter ratio do not have a constant progression as is the case in the two azimuth spectra shown in FIG. 3. In this case the progression of a backscatter ratio always has a negative frequency shift, since a vehicle (1) transporting the radar system always flies in the forward direction so that therefore all scatterers, i.e. all objects which are scanned by the radar and are backscattered, are given a negative progression of the Doppler shift.

For this reason two spectra recorded in succession are very similar to each other. In that case, in accordance with DE ·39 22 248 C2, the frequency shift Delta F(t) of a backscatter ratio portion of the azimuth spectrum as a function of a forward velocity $V_v(t)$ and a velocity $V_b(t)$ in the viewing direction of the vehicle (1) is:

$$\Delta F = \text{Frequency shift (Hz)} \cong -\frac{2 \cdot V_v^2(t) \cdot \Delta t}{\lambda \cdot R} + \frac{2 \cdot \dot{V}_b(t) \cdot \Delta t}{\lambda} \quad (1)$$

where R is the distance of the range gate from an antenna attached to the vehicle (1), Delta t the time difference between two successively recorded spectra and lambda the wavelength of the transmitted signal. As shown by the right graph in FIG. 3, the frequency shift Delta F can be determined by the maximum of the correlation of the two spectra. No moving target was present in the curve progressions represented in FIG. 3.

Next, a moving target having a velocity in the azimuth or flight direction of the vehicle (1) and a velocity transversely to the flight direction or in the range direction is examined. The velocity $v_T$ in the azimuth direction is identified as tangential velocity and the velocity $v_R$ in the range direction as radial velocity. The equation shown above can be represented by means of the velocities $v_T$ and $v_R$ as follows:

$$\Delta F_m(t) = -\frac{2 \cdot (V_v(t) - v_T(t))^2 \cdot \Delta t}{\lambda \cdot R} + \frac{2 \cdot (\dot{V}_b(t) - \dot{v}_R(t)) \cdot \Delta t}{\lambda} \quad (2)$$

wherein the velocity $v_T(t)$ in the azimuth direction has the same direction as the forward velocity $V_v(t)$ and the radial velocity $v_R(t)$ the same direction as the velocity $V_b(t)$ in the viewing direction. The frequency shift is indicated by Delta $F_m(t)$ and the radial acceleration of the moving target by $\dot{v}_R(t)$.

The Doppler rate $D_m(t)$ of the moving target is represented by the following equation (3):

$$D_m(t) = \Delta F_m(t)/\Delta t \quad (3)$$

The movement errors of the vehicle are considered to be known or corrected, so that $V_v(t) = V_v$ and $V_b(t) = 0$. The Doppler rate of the moving target therefore is:

$$D_m(t) = -\frac{2 \cdot (V_v - v_T(t))^2}{\lambda \cdot R} - \frac{2 \cdot \dot{v}_R(t)}{\lambda} \quad (4)$$

Assuming that the moving target backscatters considerably more strongly than the background, azimuth spectra as represented in FIG. 4, for example, are obtained. By forming the correlation between the adjoining azimuth spectra represented on the left in FIG. 4, the frequency shift of the dominant and also most strongly reflecting target is the frequency shift result of the correlation. This property is decisive for the direct measurement of the frequency shift of the strongly reflecting target by means of the correlation of adjoining azimuth spectra as well as for the detection of strongly reflecting moving targets.

The graph on the right in FIG. 4 shows the correlation result with two peaks. The first peak, looking from the left to the right, which is indicated by Delta F in FIG. 4, is caused as a result of the frequency shift of the terrain. The second peak, represented to the right of the first one and indicated by Delta $F_m$, is generated as a result of the moving target and at the same time is the maximum of the correlation, because the moving target backscatters more strongly than the terrain.

A constant Doppler rate is to be expected for movement-compensated raw data and is represented by Equation (1):

$$D_{nom} = -\frac{2 \cdot V_v^2}{\lambda \cdot R}, \quad (5)$$

since $V_v(t) = V_v$ and $v_b(t) = 0$.

A terrain with a road and two moving targets A' and B' is represented in FIG. 5a. The terrain was recorded by means of an imaging radar, whose direction of flight has been entered in FIG. 5a. The target A' moves in the flight or tangential direction and the target B' moves in the flight as well as the range direction (radial direction).

The corresponding SAR image is represented in FIG. 5b. Because of its tangential speed, the target A' appears indistinct in the SAR image, while the target B' does not appear at all in the SAR image because of its radial speed. It can be clearly seen from this that an SAR image alone is not suitable for detecting a moving target.

In accordance with the invention, use is therefore made of the calculation of a Doppler rate map or a frequency shift map for the detection, localization and velocity determination of a moving target. The relationship between the Doppler rate and the frequency shift is provided by Equation (3). For this purpose, steps $20_1$ to $20_3$, known from DE 39 22 428 C2, for determining a frequency shift Delta F(i) or Delta F(t) of the backscatter signal portion of an azimuth spectrum, are determined in an area 20, framed by dashed lines in FIG. 6, by the correlation of two chronologically successive azimuth spectra. Chronologically successive azimuth spectra are detected continuously in chronological succession for this purpose over a defined period of time Delta t in step $20_1$, i.e. at different times i (wherein i is a whole-number value equal to or greater than 1 and t=i·Delta t).

Two such azimuth spectra are schematically represented as examples in the left portion of FIG. 3 for the times t=0 or t=i·Delta t. The azimuth spectra at an output S (f, i), recorded in chronological sequence as a function of the azimuth frequency f, are formed in step $20_2$ for providing correlations between azimuth spectra respectively recorded in direct chronological sequence, namely K(f, i)= S(f, i)×S(f, i-1).

During the next step 203, for forming the maximum of a correlation K(f, i), the frequency shift Delta F(t) of the backscatter portion is determined by means of the position of the maximum, as can be seen schematically in the right portion of FIG. 3, which corresponds to the previously shown Equation (1).

If there is a moving target, FIG. 4 applies.

A frequency shift map Delta F(t, r)(see step 200) is prepared by evaluating the frequency shifts of the entire raw radar data set, wherein the direction of flight or the time are indicated by t and the range by r. The Doppler rate map D(t, r) is obtained after an appropriate division of the frequency shift map (step 200) by the distance Delta t in time of two azimuth spectra recorded in direct chronological sequence (see step 100).

The Doppler rate map corresponding to the original image in FIG. 5a is represented in FIG. 5c. Both moving targets A' and B' appear on the Doppler rate map and have a lower Doppler rate than all stationary targets, since their tangential velocities lie in the direction of flight. If the tangential velocity lies in the direction of flight, the relative tangential velocity aircraft—target is less than the flying speed. For this reason the resultant Doppler rate of these moving targets is less than that of stationary or fixed targets (see Equation 4). The moving targets have a higher Doppler rate if their tangential velocity is opposite the direction of flight. The detection (step 300) and localization (step 400) of a moving target A' or B' can be obtained in a simple manner by searching for values deviating from the nominal Doppler rate $D_{nom}$ (see Equation 5) on the Doppler rate map (see, for example, FIG. 5c).

The moving target must either have a tangential velocity ($V_T \neq 0$) or a radial acceleration ($v_R \neq$), so that the Doppler rate deviates from the nominal Doppler rate value of Equation 5.

An important property of the method in accordance with the invention rests in that the position of the moving target on the Doppler rate map does not depend on the radial velocity $v_R$. The problem of a moving target being represented shifted, indistinct or not at all does also not exist. Instead, moving targets have a typical "pattern" on the Doppler rate map, the two possibilities of which are shown in FIG. 5c.

The target A' has a radial velocity and has a Doppler rate $Dm_A$. The length $t_A(s)$, wherein the length in the direction of flight is indicated by $z_a(m)$ in FIG. 5c, is given by the scanning time of the antenna. The length $r_A$ in the range direction is zero if the curvature of this pattern is not taken into consideration. In this case the curvature is generated by the range progression between the radar and the target, which therefore is approximately parabolic.

The target B' has a radial velocity and has a Doppler rate $Dm_B$. The length $t_B(s)$, indicated by $z_b(m)$ in FIG. 5c, is given by the scanning time of the antenna and equals $t_A$ or $(z_b-z_a)/V_v$. The length $r_B$ depends on the radial velocity $v_T$. A curvature due to the range progression between the radar and the target is now also present here.

A localization of the moving target is obtained by determining the center of the respective pattern in the Doppler rate map. The position of the moving target is indicated in FIG. 5c by cross-hairs.

To determine the tangential velocity $v_T$ it must be assumed that the radial acceleration is negligibly small. This assumption has been proven in actuality. It is therefore possible to represent Equation (4) in a simplified way as follows:

$$D_m(t) = -\frac{2 \cdot (V_v - v_T(t))^2}{\lambda \cdot R} \quad (6)$$

The Doppler rate $D_m(t)$ is read out directly from the Doppler rate map $D(t, r)$. The tangential velocity $v_T$ can then be determined with the help of Equation (6).

The radial velocity $v_R$ of the moving target B, for example, is determined by the length $r_b$ of the moving target B', for example, in the range direction in the Doppler rate map. The radial velocity $v_R$ is the ratio between the length $r_b$ in the range direction and the time required for this, i.e. the length $t_B$ of the scanning time by the antenna. As can be seen from FIG. 5c, this length is zero for the moving target A, while the moving target B wanders to the outside and therefore is the corresponding length $r_b$.

We claim:

1. A method for the detection, localization and velocity determination of moving targets from raw radar data from a coherent, single- or multi-channel image system (SAR) carried along in a vehicle, wherein, for representing the surface of the earth with different backscatter ratios, chronologically successive azimuth spectra are continuously formed during a defined period of time and a frequency shift (Delta F(t)) of the backscatter ratio portion is obtained by determining the position of the maximum of the correlations between respectively two azimuth spectra formed chronologically directly in succession, characterized in that the frequency shifts (Delta F(t)) of the entire raw radar data set are evaluated for producing a frequency shift map (Delta (t, r));

a Doppler rate map (D(t, r)) is obtained by dividing the frequency shift map (Delta F(t, r)) by the chronological distance (Delta t) of two azimuth aspects recorded in direct succession, next a respective moving target (B) is detected by searching for values deviating from the nominal Doppler rate ($D_{nom}$) in the Doppler rate map (Delta (t, r), the center of an image of the detected moving target (B) is formed in order to localize the moving target (B) in respect to its position in the flight and range direction, by neglecting its radial acceleration, the tangential velocity ($v_T$) of the moving target is determined by means of a Doppler rate ($D_{mB}$) taken from the Doppler rate map (D(t, m)), and finally the radial velocity ($v_R$) of the moving target (B) is determined from the ratio of a length ($r_B$) of the moving target in the range direction on the Doppler rate map (Delta (t, r)) and the duration ($t_B$) of a scanning time by the antenna.

* * * * *